(12) United States Patent
Matsugashita

(10) Patent No.: US 8,533,525 B2
(45) Date of Patent: Sep. 10, 2013

(54) DATA MANAGEMENT APPARATUS, MONITORING APPARATUS, REPLICA APPARATUS, CLUSTER SYSTEM, CONTROL METHOD AND COMPUTER-READABLE MEDIUM

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/949,530

(22) Filed: Nov. 18, 2010

(65) Prior Publication Data

US 2011/0161724 A1 Jun. 30, 2011

(30) Foreign Application Priority Data

Dec. 25, 2009 (JP) ................................. 2009-296379

(51) Int. Cl.
*G06F 11/00* (2006.01)

(52) U.S. Cl.
USPC ........................................................ 714/4.11

(58) Field of Classification Search
USPC ................................................. 714/4.1, 4.11
See application file for complete search history.

(56) References Cited

U.S. PATENT DOCUMENTS

| | | | | |
|---|---|---|---|---|
| 5,950,210 | A  * | 9/1999 | Nelson | 1/1 |
| 2002/0197992 | A1* | 12/2002 | Nizri et al. | 455/435 |
| 2003/0214525 | A1* | 11/2003 | Esfahany | 345/700 |
| 2003/0233597 | A1* | 12/2003 | Armstrong | 714/24 |
| 2005/0262173 | A1* | 11/2005 | Choquier et al. | 707/204 |
| 2006/0101087 | A1* | 5/2006 | Tsukada et al. | 707/200 |
| 2009/0006884 | A1* | 1/2009 | Cahill et al. | 714/4 |
| 2009/0170507 | A1* | 7/2009 | Kim | 455/433 |
| 2010/0128298 | A1 | 5/2010 | Matsugashita | |

FOREIGN PATENT DOCUMENTS

| | | |
|---|---|---|
| JP | 5191409 A | 7/1993 |
| JP | 2004171370 A | 6/2004 |
| JP | 2006235837 A | 9/2006 |

* cited by examiner

*Primary Examiner* — Yair Leibovich
(74) *Attorney, Agent, or Firm* — Fitzpatrick, Cella, Harper & Scinto

(57) ABSTRACT

A data management apparatus, which is connected to a monitoring apparatus that monitors an operating state of a service, and which provides a service for managing data, comprises: a status management unit which manages a status of a service provided by itself; a notification unit which periodically notifies the monitoring apparatus of a status of the service; a receiving unit which receives a request from an application to which the service is provided; and a rejecting unit which rejects, when the request received by the receiving unit is an update request of data, the update request if a status associated with updating of the service managed by the status management unit is a limited status.

11 Claims, 13 Drawing Sheets

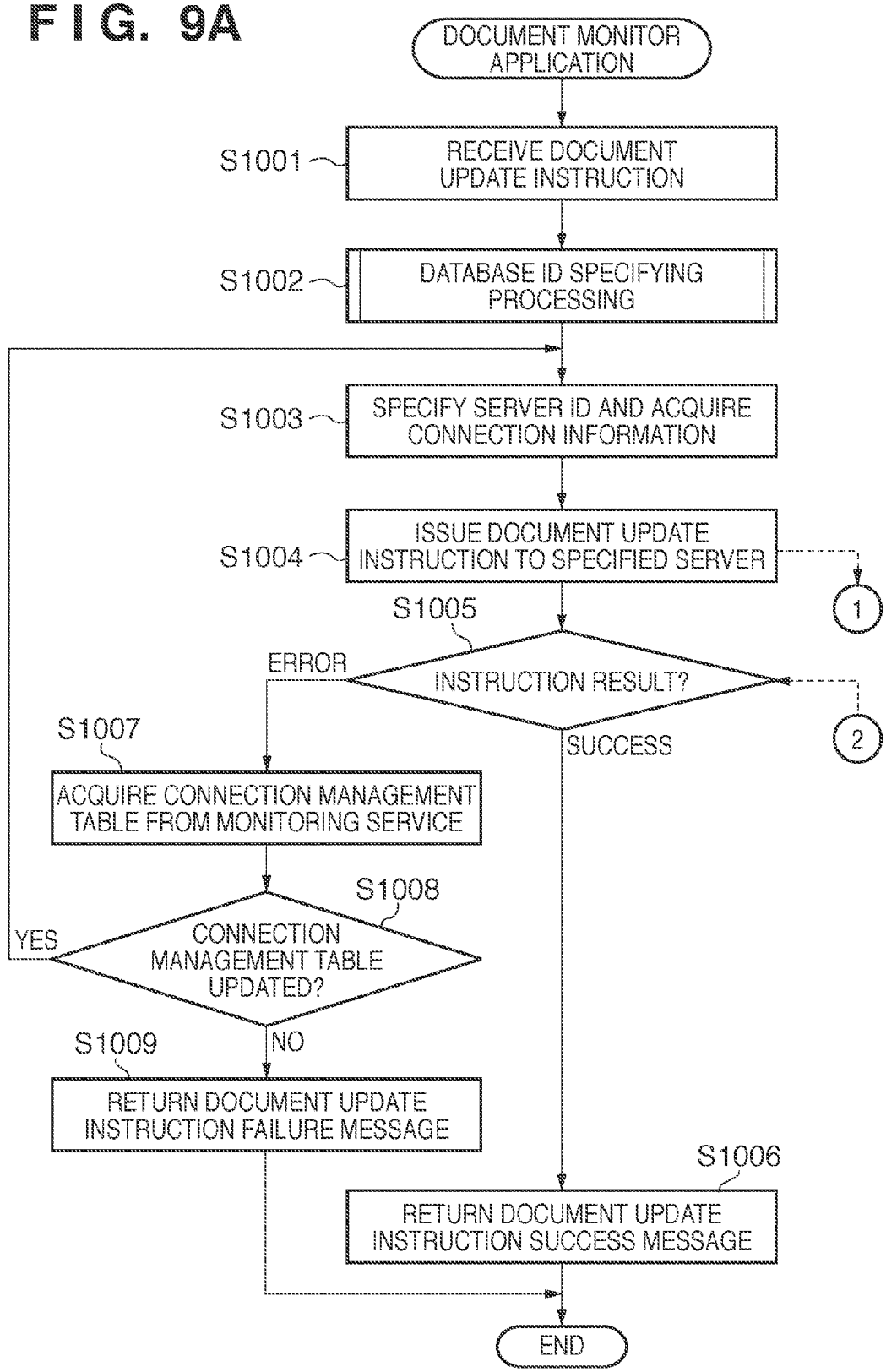

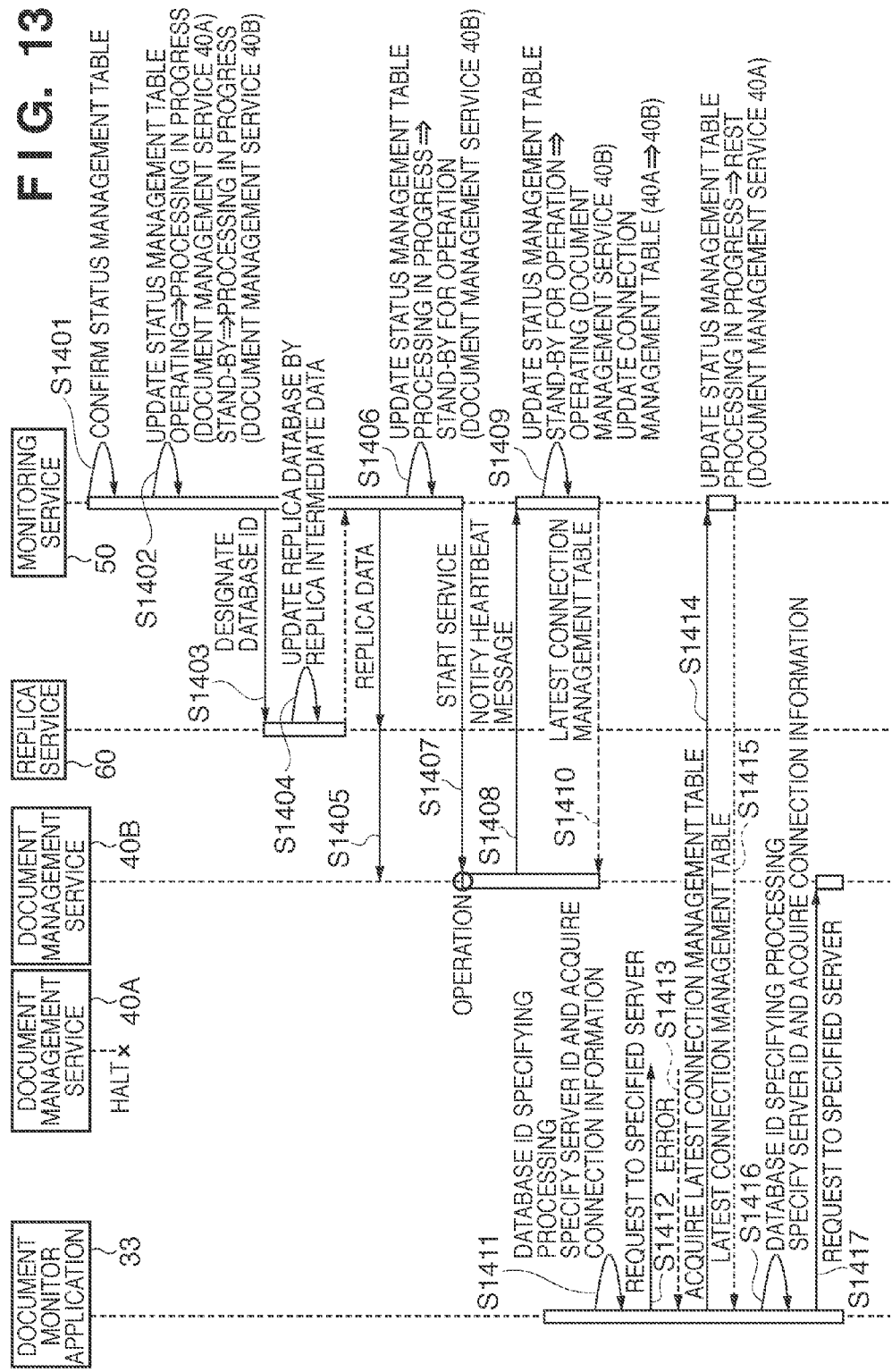

DATA MANAGEMENT APPARATUS, MONITORING APPARATUS, REPLICA APPARATUS, CLUSTER SYSTEM, CONTROL METHOD AND COMPUTER-READABLE MEDIUM

BACKGROUND OF THE INVENTION

1. Field of the Invention

The present invention relates to a cluster system including an information processing apparatus with a redundancy configuration of operating and stand-by nodes, a control method, and a computer-readable medium and, more particularly, to a control method of the redundancy configuration in the cluster system which performs distributed management of data using a plurality of nodes.

2. Description of the Related Art

As a cluster system, which distributes loads to a plurality of nodes, a system which includes a stand-by node as an auxiliary unit in addition to an operating node, and implements fail-over processing for the stand-by node when the operating node goes down, so as to continue system operation is known. For example, in Japanese Patent Laid-Open No. 2006-235837, a load distribution apparatus management server manages connection information required to access an operating node, and each client specifies and accesses the operating node based on the connection information. Then, the load distribution apparatus management server monitors the status of the operating node. When resources of the operating node become short, the server switches the operating node to a standby-node to update the connection information, thereby implementing the fail-over function.

On the other hand, a method of implementing the fail-over function in a node that holds static data (to be referred to as a database hereinafter) is known. For example, in Japanese Patent Laid-Open No. 05-191409, a backup of a database of an operating node is held by a stand-by node, and a change of the database of the operating node is transmitted to the stand-by node as needed. Then, when a failure such as power-OFF has occurred in the operating node, the operating node is recovered using the backup of the stand-by node, thus implementing the fail-over function.

In the configurations required to implement the fail-over function, a phenomenon that both the operating and stand-by nodes operate as operating nodes depending on the system circumstances is known as a problem. In order to solve this problem, for example, in Japanese Patent Laid-Open No. 2004-171370, a given node confirms whether or not the self-node is isolated by attempting a communication with another node in addition to mutual communications between the operating and stand-by nodes, and only when it is judged that the self-node is not isolated, a connection is enabled.

However, the related arts cannot easily implement the fail-over configuration in the following two situations. As the first situation, in an environment configured by a plurality of operating nodes, a wide variety of mutual communications with a stand-by node have to be covered, resulting in difficult management. Since a network becomes more complicated with increasing number of nodes, it is difficult to judge if the self-node is only isolated by a communication with another node when, for example, the other node itself is isolated. For this reason, both the operating and stand-by nodes are likely to operate. Especially, when each node manages data, identical data is updated from both the operating and stand-by nodes, and may become inconsistent. As the second situation, when a communication link between the stand-by node that holds the backup and the operating node is disconnected, backup data can no longer be updated. If fail-over processing is executed, data is lost, and the data consistency cannot be ensured.

SUMMARY OF THE INVENTION

According to one aspect of the present invention, there is provided a data management apparatus, which is connected to a monitoring apparatus that monitors an operating state of a service, and which provides a service for managing data, comprising: a status management unit which manages a status of a service provided by itself; a notification unit which periodically notifies the monitoring apparatus of a status of the service; a receiving unit which receives a request from an application to which the service is provided; and a rejecting unit which rejects, when the request received by the receiving unit is an update request of data, the update request if a status associated with updating of the service managed by the status management unit is a limited status, wherein when the notification by the notification unit has failed, the status management unit transits the status associated with updating of the service to a limited status, and when the notification by the notification unit has succeeded, the status management unit transits the state associated with updating of the service to a normal status in which the update request is not rejected.

According to another aspect of the present invention, there is provided a monitoring apparatus, which monitors an operating state of a service provided by a connected data management apparatus, comprising: a management unit which manages a status associated with operation of the service to be monitored based on a notification from a connected apparatus; a determination unit which determines whether or not the status associated with operation of the service, which is held in the management unit, transits from an operating status to a halt status; a fail-over determination unit which determines, for the service, the status associated with operation of which is determined to have transited from the operating status to the halt status, whether or not a status associated with fail-over processing indicates inhibition; and a halt unit which halts the service, the status associated with operation of which is determined to have transited to the halt status, when the fail-over determination unit determines that the fail-over processing is inhibited.

According to another aspect of the present invention, there is provided a monitoring apparatus, which monitors an operating state of a replica service provided by a connected replica apparatus, comprising: a management unit which manages a status associated with operation of the replica service to be monitored based on a notification from the connected replica apparatus; a determination unit which determines whether or not a status associated with operation of a first replica service which is managed and held by the management unit transits from an operating status to a halt status; a stand-by service confirming unit which confirms whether or not a second replica service, a status associated with operation of which is a stand-by status, exists; a halt unit which sets a status associated with fail-over processing to be an inhibition status for data to be replicated by the first replica service when the second replica service does not exist, the management unit setting the status associated with operation of the first replica service to be a halt status; and a rest unit which executes fail-over processing from the first replica service to the second replica service when the second replica service exists, the management unit setting the status associated with operation of the first replica service to be a rest status.

According to another aspect of the present invention, there is provided a replica apparatus, which is connected to a monitoring apparatus that monitors an operating state of a service, and a data management apparatus that manages data, and provides a service for replicating the data, comprising: a status management unit which manages a status of a service provided by itself; a notification unit which periodically notifies the monitoring apparatus of a status associated with operation; and a reflection unit which reflects, when a status associated with updating of the service is a normal status, update contents stored in a second storage area included in the data management apparatus to data stored in a first storage area included in the replica apparatus, wherein when the notification by the notification unit has failed, the status management unit transits the status associated with updating of the service to a limited status, and when the notification by the notification unit has succeeded, the status management unit transits the status associated with updating of the service to a normal status in which an update request is not rejected.

According to another aspect of the present invention, there is provided a cluster system, which comprises a plurality of data management apparatuses, a plurality of replica apparatuses, and a monitoring apparatus, wherein the data management apparatus comprises: a status management unit which manages a status of a service provided by itself; a notification unit which periodically notifies the monitoring apparatus of a status of the service; a receiving unit which receives a request from an application to which the service is provided; and a rejecting unit which rejects, when the request received by the receiving unit is an update request of data, the update request if the status associated with updating of the service managed by the status management unit is a limited status, when the notification by the notification unit has failed, the status management unit transits the status associated with updating of the service to a limited status, when the notification by the notification unit has succeeded, the status management unit transits the state associated with updating of the service to a normal status in which the update request is not rejected, the replica apparatus comprises: a status management unit which manages a status of a service provided by itself; a notification unit which periodically notifies the monitoring apparatus of a status associated with operation; and a reflection unit which reflects, when the status associated with updating of the service is a normal status, update contents stored in a second storage area included in the data management apparatus to data stored in a first storage area included in the replica apparatus, and the monitoring apparatus comprises: a management unit which manages a status associated with operation of the service to be monitored based on a notification from a connected apparatus; a determination unit which determines whether or not the status associated with operation of the service, which is managed by the management unit, transits from an operating status to a halt status; a fail-over determination unit which determines, for the service, the status associated with operation of which is determined to have transited from the operating status to the halt status, whether or not a status associated with fail-over processing indicates inhibition; and a halt unit which halts the service, the status associated with operation of which is determined to have transited to the halt status when the fail-over determination unit determines that the fail-over processing is inhibited.

According to another aspect of the present invention, there is provided a control method of a data management apparatus, which is connected to a monitoring apparatus that monitors an operating state of a service, and which provides a service for managing data, comprising: a status management step of controlling a status management unit of the data management apparatus to manage a status of a service provided by itself; a notification step of controlling a notification unit of the data management apparatus to periodically notify the monitoring apparatus of a status of the service; a receiving step of controlling a receiving unit of the data management apparatus to receive a request from an application to which the service is provided; and a rejecting step of controlling a rejecting unit of the data management apparatus to reject, when the request received in the receiving step is an update request of data, the update request if the status associated with updating of the service managed in the status management step is a limited status, wherein in the status management step, when the notification in the notification step has failed, the status associated with updating of the service is transited to a limited status, and when the notification in the notification step has succeeded, the state associated with updating of the service is transited to a normal status in which the update request is not rejected.

According to another aspect of the present invention, there is provided a control method of a replica apparatus, which is connected to a monitoring apparatus that monitors an operating state of a service, and a data management apparatus that manages data, and provides a service for replicating the data, comprising: a status management step of controlling a status management unit of the replica apparatus to manage a status of a service provided by itself; a notification step of controlling a notification unit of the replica apparatus to periodically notify the monitoring apparatus of a status associated with operation; and a reflection step of controlling a reflection unit of the replica apparatus to reflect, when a status associated with updating of the service is a normal status, update contents stored in a second storage area included in the data management apparatus to data stored in a first storage area included in the replica apparatus, wherein in the status management step, when the notification in the notification step has failed, the status associated with updating of the service is transited to a limited status, and when the notification in the notification step has succeeded, the status associated with updating of the service is transited to a normal status in which an update request is not rejected.

According to another aspect of the present invention, there is provided a control method of a monitoring apparatus, which monitors an operating state of a service provided by a connected data management apparatus, comprising: a management step of controlling a management unit of the monitoring apparatus to manage a status associated with operation of the service to be monitored based on a notification from the apparatus; a determination step of controlling a determination unit of the monitoring apparatus to determine whether or not the status associated with operation of the service, which is managed in the management step, transits from an operating status to a halt status; a fail-over determination step of controlling a fail-over determination unit of the monitoring apparatus to determine, for the service, the status associated with operation of which is determined to have transited from the operating status to the halt status, whether or not a status associated with fail-over processing indicates inhibition; and a halt step of controlling a halt unit of the monitoring apparatus to halt the service, the status associated with operation of which is determined to have transited to the halt status when it is determined in the fail-over determination step that the fail-over processing is inhibited.

According to the present invention, the fail-over configuration can be easily implemented even in the following two situations. As the first situation, even in a cluster system configured by a plurality of operating nodes, fail-over processing that can avoid a situation in which both operating and stand-by nodes update identical data under the control of a single monitoring server alone can be implemented. As the second situation, when a communication link with a server that holds a backup is disconnected, data can be avoided from being lost as a result of execution of fail-over processing.

Further features of the present invention will become apparent from the following description of exemplary embodiments (with reference to the attached drawings).

BRIEF DESCRIPTION OF THE DRAWINGS

FIGS. 9A and 9B are flowcharts of document manipulation processing according to the embodiment;

FIG. 13 is a sequence chart of fail-over processing according to the embodiment.

DESCRIPTION OF THE EMBODIMENTS

[System Arrangement]

Figure 1:
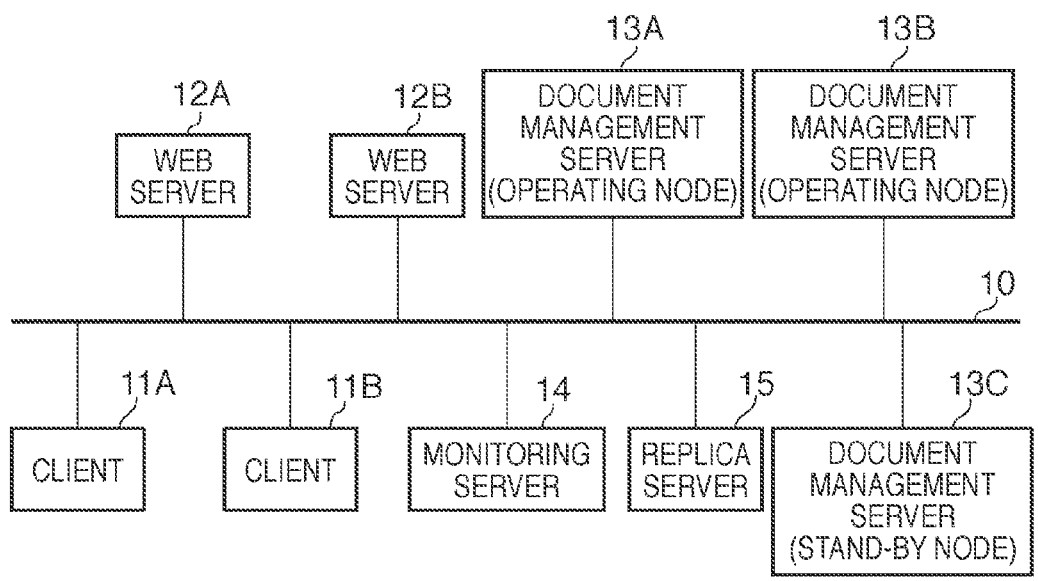
FIG. 1 is a block diagram showing the network arrangement according to an embodiment of the present invention.

The best mode of carrying out the present invention will be described hereinafter with reference to the drawings. FIG. 1 is a block diagram showing the system arrangement according to an embodiment of the present invention. Referring to FIG. 1, a network 10 connects respective components. Clients 11A and 11B issue requests to Web servers 12A and 12B. The Web servers 12A and 12B receive the requests from the clients. Document management servers 13A and 13B are data management apparatuses as operating nodes, which process the requests received by the Web servers, and a document management server 13C is a document management server as a stand-by node, which inherits processing when abnormalities have occurred in the document management servers 13A and 13B. Note that these components will be described as a client 11, Web server 12, and document management server 13 when they are generically expressed. In the following description, assume that data managed by each data management apparatus is document data.

A monitoring server 14 monitors the operating states of respective services, and executes fail-over processing to be described later. A replica server 15 generates a replica (copy) of a database managed by each document management server. The respective components are connected via the network 10 to be able to communicate with each other. Communications are made using an HTTP or SOAP on the HTTP, that is, Web services, and mutual communications based on TCP/IP as communication means.

Figure 2:
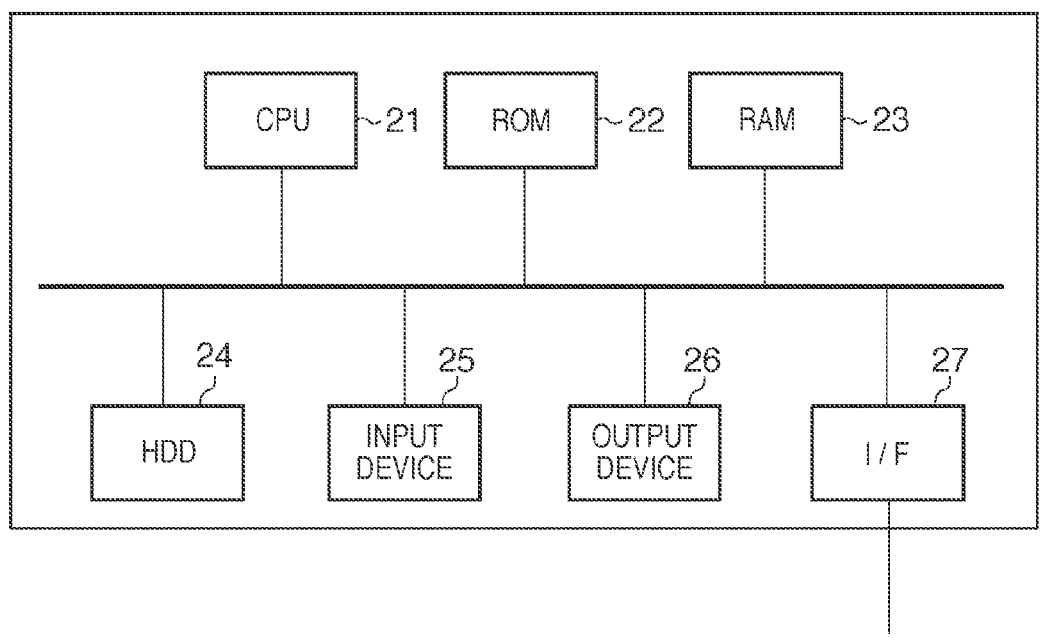
FIG. 2 is a block diagram showing the hardware arrangement according to the embodiment.

FIG. 2 is a block diagram showing the hardware arrangement of the client 11, Web server 12, document management server 13, monitoring server 14, or replica server 15 shown in FIG. 1. Referring to FIG. 2, a CPU 21 directly or indirectly controls respective devices (a ROM 22, RAM 23, and the like to be described below) connected via an internal bus, and executes programs required to implement the present invention. A ROM 22 stores, for example, data such as a BIOS. A RAM 23 is used as a work area of the CPU 21, and also as a temporary storage area for loading software modules required to implement the present invention. An HDD 24 is an indirect storage device such as an HDD (hard disk drive) or SSD (solid-state drive), which stores an OS as basic software and software modules. An input device 25 indicates a keyboard and pointing device (neither are shown). An output device 26 indicates, for example, a display. An I/F 27 is required to be connected to the network 10.

In these hardware components, after the startup processing, the CPU 21 executes the BIOS stored in the ROM 22, and the OS is loaded from the HDD 24 onto the RAM 23 to be executable. The CPU 21 loads various software modules from the HDD 24 onto the RAM 23 as needed to be executable according to the operation of the OS. The various software modules are executed and activated by the CPU 21 by cooperations of the aforementioned devices. The I/F 27 is connected to the network 10, and is controlled by the CPU 21 according to the operation of the OS to implement communications by the aforementioned communication means.

[Module Configuration]

Figure 3:
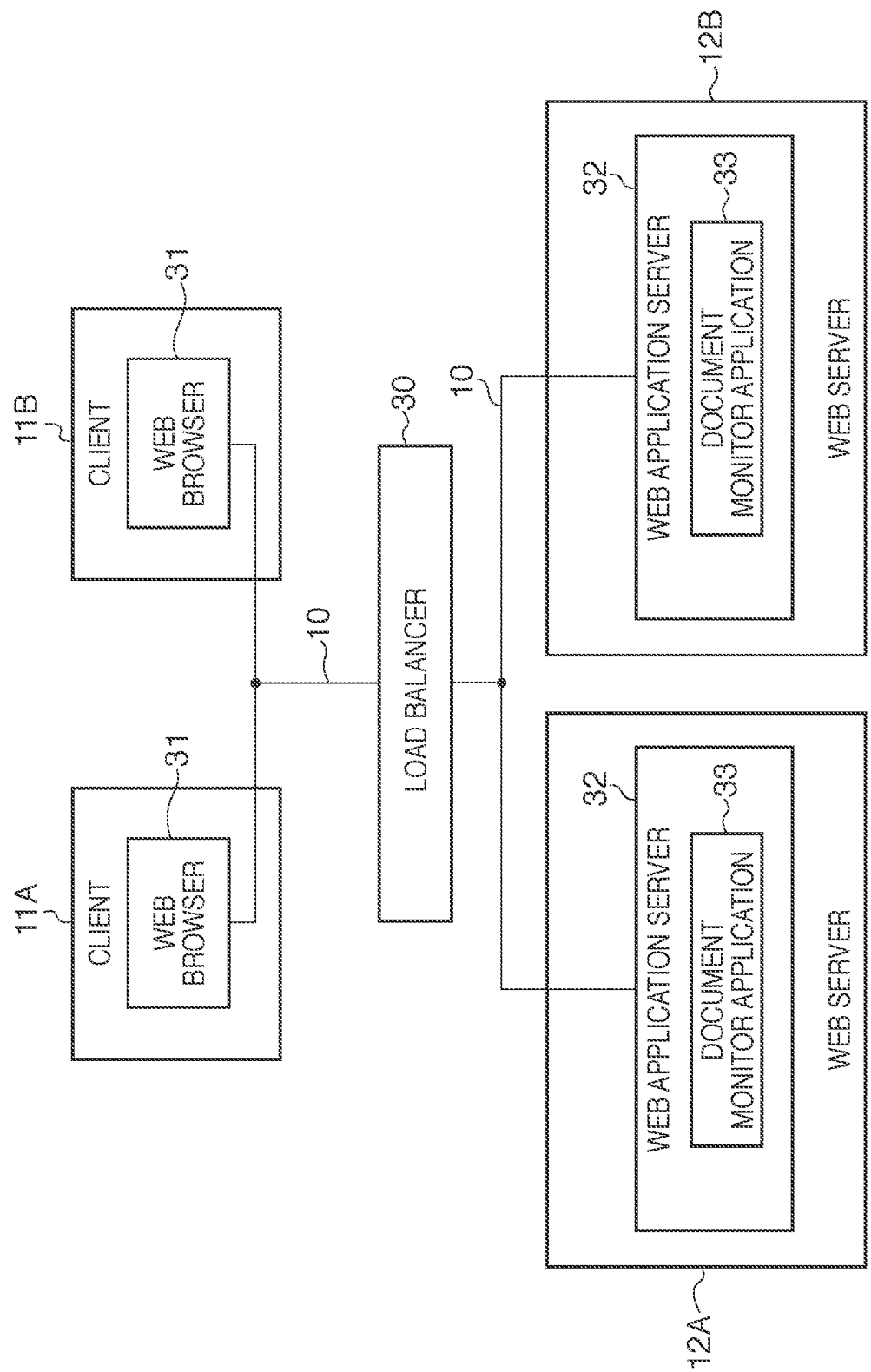
FIG. 3 is a block diagram showing the arrangements of Web browsers and Web server modules according to the embodiment.

FIG. 3 is a block diagram showing the configurations of software modules that run on the clients 11 and Web servers 12. Note that the respective software modules are stored in the HDD 24 shown in FIG. 2, and are loaded and executed on the RAM 23 by the CPU 21.

A load balancer 30 implements distributions of processing loads by distributing requests from the clients 11 to the plurality of Web servers 12A and 12B. The clients 11 and Web servers 12 are connected by the network 10 via relay of this load balancer 30 to be able to mutually communicate with each other. Each client 11 includes a Web browser 31 as a user interface application. Each Web server 12 includes a Web application server 32, in which a document monitor application 33 is deployed. This document monitor application 33 is configured as a so-called Web application on the Web application server 32, and each client 11 can access this application via the Web browser 31.

The document monitor application 33 sends back user interface information in response to a request from the Web browser 31. The Web browser 31 renders and displays the user interface information obtained from the document monitor application 33. The displayed user interface information includes, for example, a document information list managed by a document management service, and an interface used to request a document manipulation. The document monitor application 33 issues an acquisition request of the document information list and a document manipulation request of a document requested from the Web browser 31 to the document management service. Details of these processes will be described later.

Figure 4:
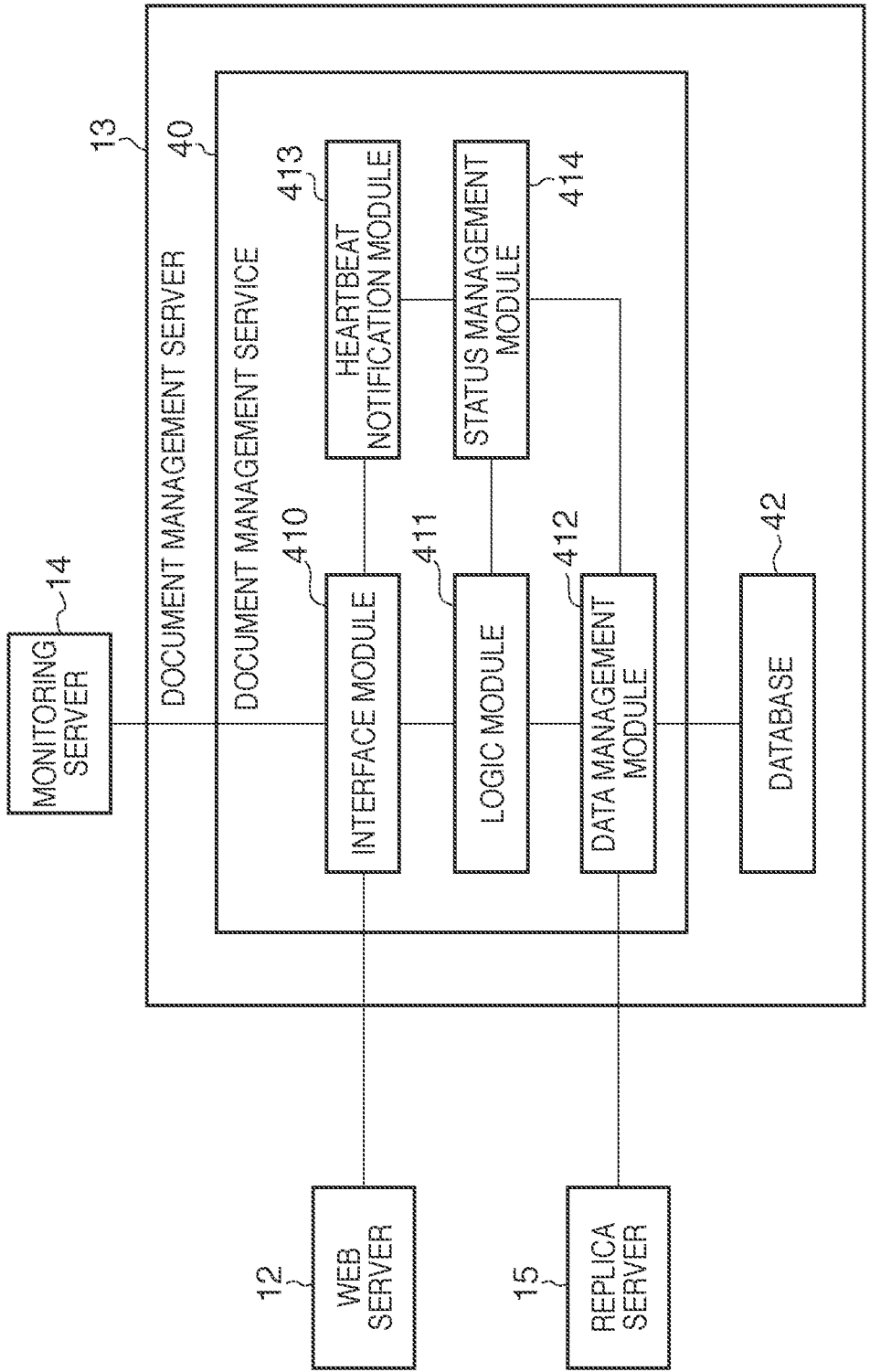
FIG. 4 is a block diagram showing the arrangement of a document management service module according to the embodiment.

FIG. 4 is a block diagram showing the configuration of software modules that run on the document management server 13. Note that the respective software modules are stored in the HDD 24 shown in FIG. 2, and are loaded and executed on the RAM 23 by the CPU 21, as described above. The document management server 13 provides a document management service related to document management. A document management service 40 receives requests associated with various processes from the aforementioned document monitor application 33, and executes various processes for a document. This implements a receiving unit. The document management service 40 is configured by an interface module 410 which processes communications with other services, a logic module 411 which executes processes according to received requests, a data management module 412 which executes processes for document data, a heartbeat notification module 413 as a trigger required to periodically notify a self heartbeat message, and a status management module 414 which manages a self service status. The document management service 40 executes processes by cooperations of these modules.

The interface module 410 communicates with the document monitor application 33 and the monitoring server 14. Also, the data management module 412 communicates with the replica server 15. These communications are executed by the CPU 21 in FIG. 2 via the I/F 27 according to the operation of the OS which receives instructions from the respective software modules. A database 42 stores information of document data, and is stored in the HDD 24 shown in FIG. 2.

Figure 5:
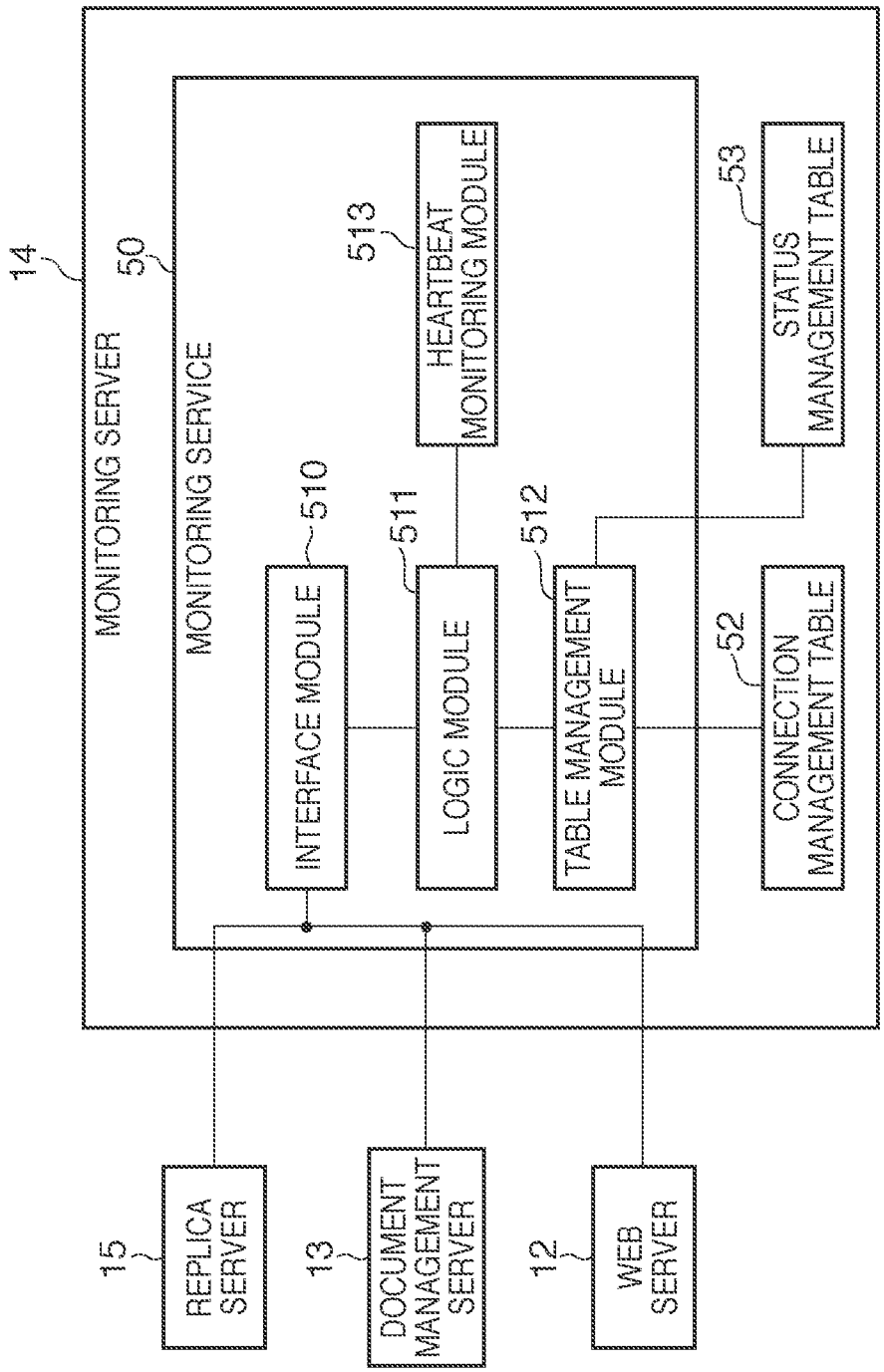
FIG. 5 is a block diagram showing the arrangement of a monitoring service module according to the embodiment.

FIG. 5 is a block diagram showing the configuration of software modules which run on the monitoring server 14. Note that the respective software modules are stored in the HDD 24 shown in FIG. 2, and are loaded and executed on the RAM 23 by the CPU 21, as described above. The monitoring server 14 provides a monitoring service associated with monitoring of the operating states of inner and outer applications of the apparatus. A monitoring service 50 monitors the operating statuses of the document management service 40 and replica server 15, and executes, for example, fail-over processing according to the operating statuses of the respective services. The monitoring service 50 receives a request from the document monitor application 33, and sends back connection information to the document management service 40. The monitoring service 50 is configured by an interface module 510 which processes communications with other services, a logic module 511 which executes processes according to received requests, a table management module 512 which executes processes for various management tables to be described later, and a heartbeat monitoring module 513 as a trigger required to periodically monitor the heartbeat statuses of respective services. The monitoring service 50 executes processes by cooperations of these modules.

The interface module 510 communicates with the aforementioned document monitor application 33 and the replica server 15 to be described later. These communications are executed by the CPU 21 in FIG. 2 via the I/F 27 according to the operation of the OS which receives instructions from the respective software modules. A connection management table 52 stores connection information required for the document monitor application 33 to communicate with the document management service 40. A status management table 53 stores the statuses of respective services. These management tables are stored in the HDD 24 shown in FIG. 2.

Figure 6:
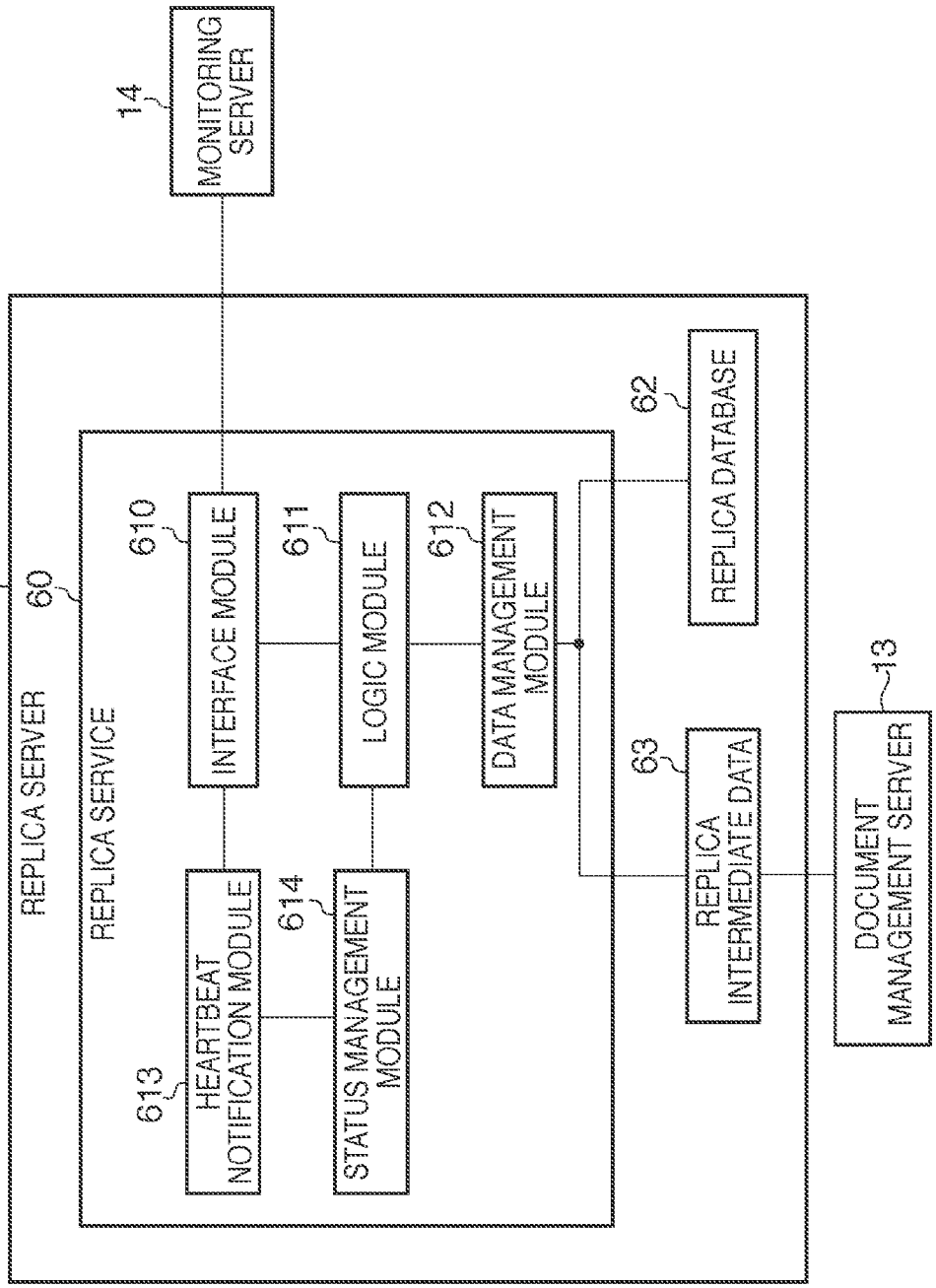
FIG. 6 is a block diagram showing the arrangement of a replica service module according to the embodiment.

FIG. 6 is a block diagram showing the configuration of software modules which run on the replica server 15. Note that the respective software modules are stored in the HDD 24 shown in FIG. 2, and are loaded and executed on the RAM 23 by the CPU 21, as described above. The replica server 15 provides a replica service associated with replicas of various data. A replica service 60 generates a replica of the database 42 managed by the document management service 40. The generated replica is used at the time of fail-over processing to be described later. The replica service 60 includes an interface module 610 which processes a communication with the monitoring service 50. This communication is executed by the CPU 21 in FIG. 2 via the I/F 27 according to the operation of the OS which receives an instruction from the interface module 610. The replica service 60 is configured by a logic module 611 which processes received requests, a data management module 612 which executes processes for replica intermediate data and a replica database (to be described later), a heartbeat notification module 613 as a trigger required to periodically notify a self heartbeat message, and a status management module 614 which manages self service statuses. The replica service 60 executes processes by cooperations of these modules.

A replica database 62 is a replica of the database 42 managed by the document management service 40. Also, replica intermediate data 63 is intermediate data of a replica before the replica is reflected to the replica database 62. More specifically, the data management module 412 in the document management service 40 of the document management server 13 records processes to be executed for the database 42 as commands. This replica intermediate data 63 is stored in the HDD 24 in a shared file format that can be shared with other servers based on the mechanism of the OS, and is configured to be accessible from both the document management service 40 and replica service 60.

[Management Table]

Figure 7A:
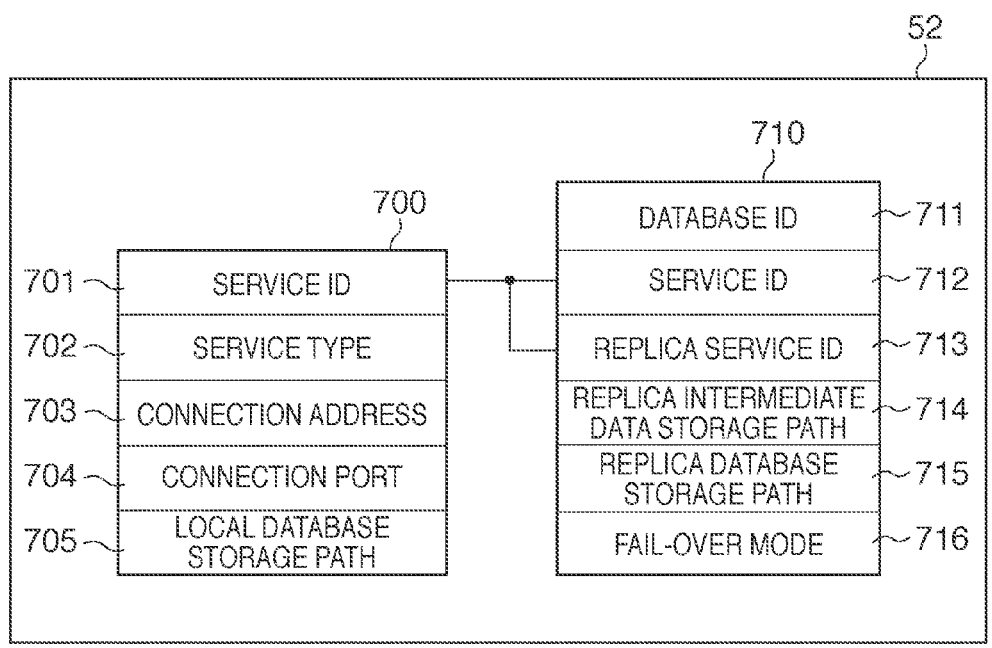
FIGS. 7A and 7B show management tables according to the embodiment.

FIG. 7A shows the data structure of the connection management table 52. The connection management table 52 is configured by service information 700 and database information 710. The service information 700 stores and manages information of the document management service 40 and replica service 60. The service information 700 is configured by, for example, a service ID 701 as a service identifier, a service type 702 which indicates a type of a service, a connection address 703 which stores a connection address to a service, a connection port 704 which stores a connection port number to a service, and a local database storage path 705 as a storage path of a database managed by a service. The service type 702 is a field required to discriminate the document management service 40 or replica service 60. The connection address 703 stores information such as an IP address or FQDN that can uniquely identify a server on which a service operates in the network 10.

The database information 710 stores and manages a database and replica information of the database. The database information 710 is configured by a database ID 711 as a database identifier, a service ID 712 as an identifier of a service which manages the database, a replica service ID 713 as an identifier of a replica service which generates a replica of the database, a replica intermediate data storage path 714 as a path for storing replica intermediate data of the database, a replica database storage path 715 where a replica of the database is generated, and a fail-over mode 716 which stores a status indicating the advisability of fail-over processing (to be described later). The service ID 712 and replica service ID 713 relate to the service ID of the service information 700. Note that the configuration of the connection management table shown in FIG. 7A is an example, and may include other elements.

Figure 7B:
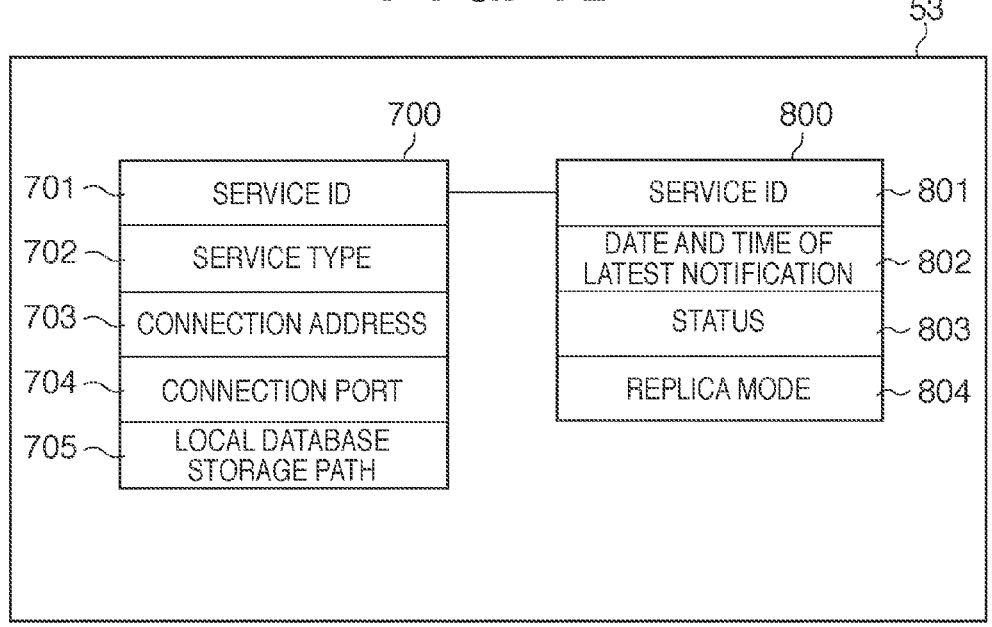

FIG. 7B shows the data structure of the status management table 53. The status management table 53 is configured by the aforementioned service information 700 and status information 800. The status information 800 stores and manages the heartbeat states and statuses of the document management service 40 and replica service 60. The status information 800 is configured by, for example, a service ID 801 as a service identifier, a date and time of latest notification 802 which stores a date and time of receiving a latest heartbeat message from a service, a status 803 which stores a status of an operation of a service, and a replica mode 804 which stores information indicating whether replication (to be described later) is performed locally or remotely. The status 803 includes "operating" indicating an operating node, "stand-by" indicating a stand-by node, "halt" indicating a node which went down due to an abnormality and has not undergone fail-over processing yet, "rest" indicating a node which went down due to an abnormality and has undergone fail-over processing, "processing in progress" indicating a node whose fail-over processing is in progress, and whose operating state is in transition, and "stand-by for operation". The transitions of operating states will be described later. The service ID 801 relates to that of the service information 700. Note that the configuration of the status management table 53 shown in FIG. 7B is an example, and may have other elements. The statuses indicated by the status 803 are not limited to those defined above, and may be added or deleted as needed.

In this embodiment, in order to handle various "statuses", statuses (normal mode, control mode) of a service associated with updating will be described as "service statuses", statuses (operating, halt, etc.) associated with operations of a service will be described as "operating statuses", statuses (local replica mode, remote replica mode) associated with storage (replication) will be described as "storage statuses", and statuses (fail-over permission, inhibition) associated with fail-over processing will be described as "fail-over statuses" for the sake of convenience.

[Login Processing]

Figure 8:
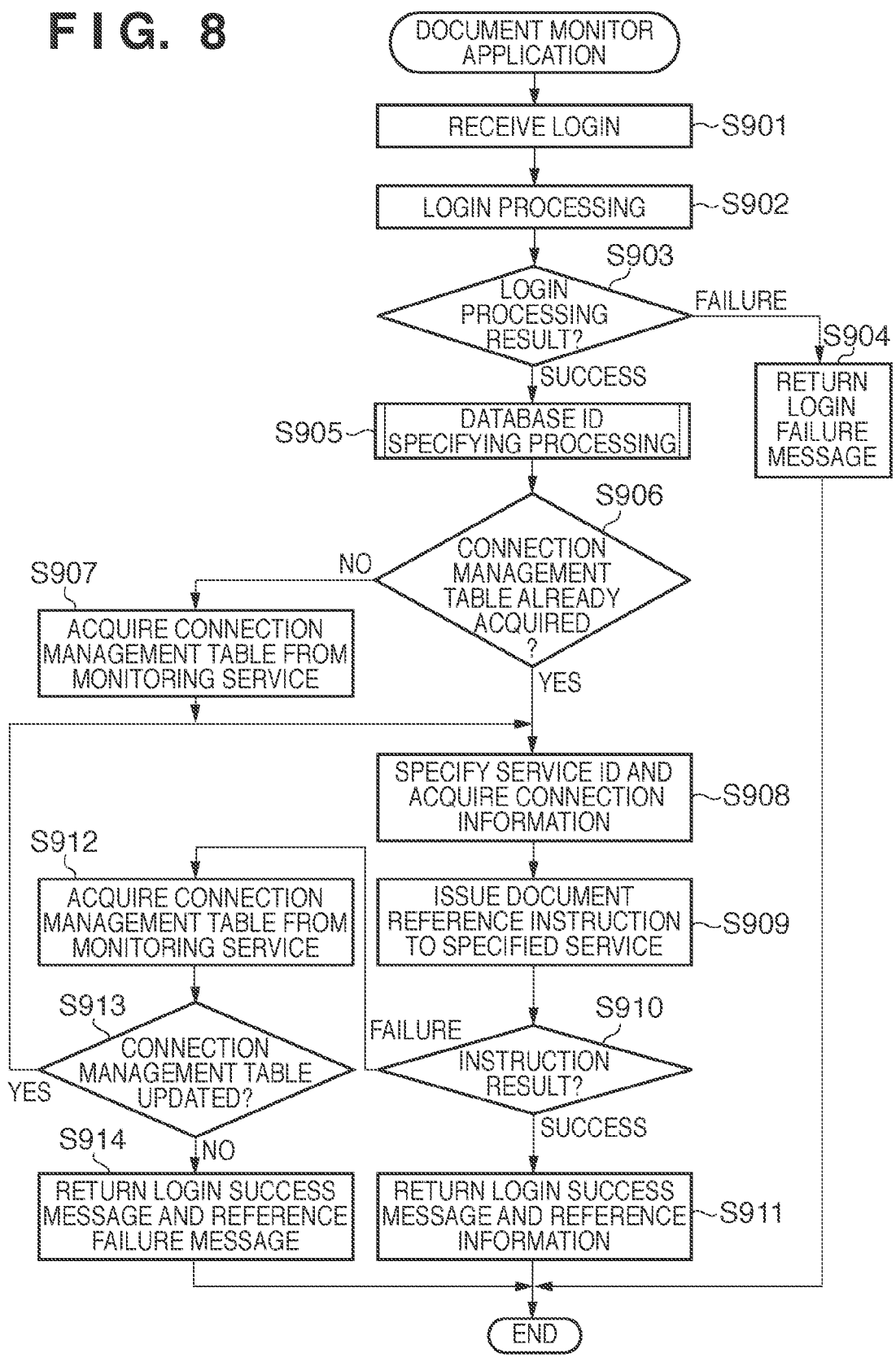
FIG. 8 is a flowchart of login processing from a Web browser according to the embodiment.

The processing sequences in the respective software modules of the present invention will be described below using the flowcharts. FIG. 8 is a flowchart showing processing executed when the document monitor application 33 in the Web server 12 receives a login request from the Web browser 31 in the client 11. The processes of the following flowchart are executed when the document monitor application 33 is loaded onto the RAM 23 of the Web server 12 and is executed by the CPU 21.

In step S901, the document monitor application 33 receives a login request from the Web browser 31. A login method is not particularly limited, and Web standard authentication methods such as Form authentication, Basic authentication, and Kerberos authentication, or a unique authentication method may be used. In step S902, the document monitor application 33 executes login processing. In this case, authorization may be executed based on a method of sending an inquiry to a directory server such as an LDAP server (not shown) or a unique user management method. Next, the document monitor application 33 checks in step S903 whether or not the login processing has succeeded. The login processing has "failed" in case of an access by an unauthorized user or an illicit password, and the document monitor application 33 sends back a login failure message to the Web browser 31 in step S904, thus ending the processing.

If the login processing has succeeded, the document monitor application 33 executes database ID specifying processing in step S905. This database ID specifying processing specifies a database which manages document data that the login user can refer to. As a method to accomplish this, a method of managing a correspondence table of user IDs and database IDs to associate them with each other, and a method of mapping hash values of user IDs and those of database IDs on a circle, and managing a user ID by a database ID having a closest value may be used. The method to be used will change depending on how a database is divided. In the present invention, assume that a database is divided by user group units, and hash values of user IDs and those of database IDs are mapped on a circle, that is, they are mapped by a Consistent Hash method. Note that the present invention is not limited to this method, and methods other than the aforementioned method may be used as needed.

After the database ID is specified, the document monitor application 33 checks in step S906 if the connection management table 52 has already been acquired from the monitoring service 50. If the connection management table 52 has not been acquired yet, the document monitor application 33 acquires the connection management table 52 from the monitoring service 50 in step S907. Next, the document monitor application 33 specifies a service that manages information based on the specified database ID and the acquired connection management table 52 in step S908. More specifically, the document monitor application 33 specifies the service ID 712 based on the database ID 711 of the database information 710, and acquires the connection address 703 and connection port 704 of the service information 700, which is related based on the service IDs. The document monitor application 33 issues a document information reference request to the specified document management service in step S909, and checks a request result in step S910.

If the request has succeeded, the document monitor application 33 returns the referred document information to the Web browser 31 together with the login success message in step S911, thus ending the processing. The document information includes, for example, information such as a document ID used to uniquely specify a document, a document name, a document creator, and a date of creation. If the request has failed, the document monitor application 33 acquires the connection management table 52 from the monitoring service 50 again in step S912. This is because the connection management table 52 may have been updated due to fail-over processing to be described later or the downed document management service 40. The document monitor application 33 checks in step S913 whether or not the re-acquired connection management table 52 has been updated. If the connection management table 52 has been updated, the document monitor application 33 repetitively executes the same processes from step S908. If the connection management table 52 has not been updated, the document monitor application 33 returns a reference failure message to the Web browser 31 together with a login success message in the Web browser 31 in step S914, thus ending the processing. In this case, a predetermined count may be defined, and retry processing for repeating the sequence from step S908 may be executed. With the above processing, the document monitor application 33 executes the login processing from the Web browser 31.

[Document Manipulation Processing]

Figure 9B:
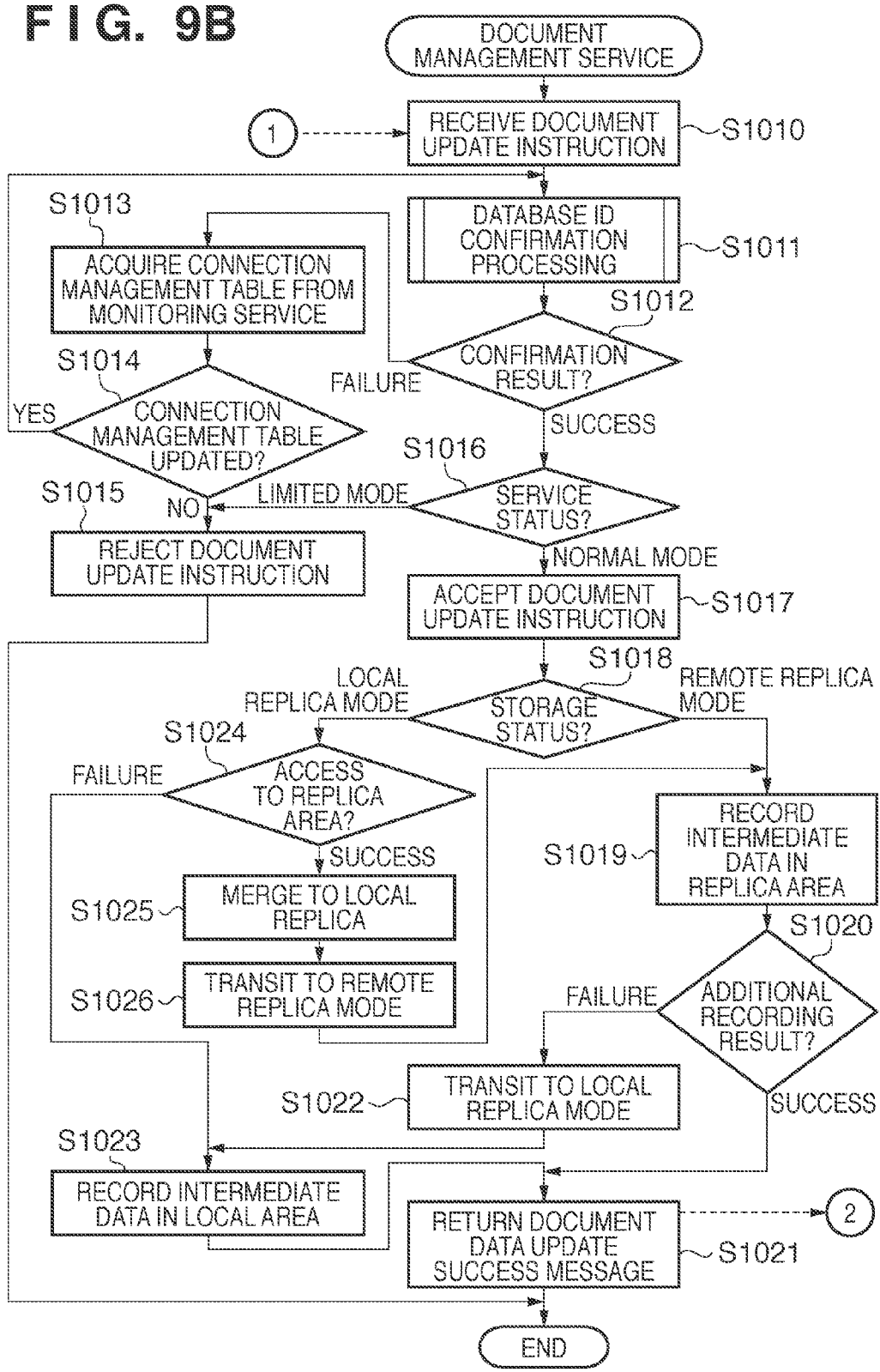

FIGS. 9A and 9B are flowcharts executed when the document monitor application 33 issues a document data update request to the document management service 40. In the state of this flowchart, the login processing described using FIG. 8 has already been executed. Note that the processes of the following flowchart are executed when the document monitor application 33 is loaded onto the RAM 23 of the Web server 12 and is executed by the CPU 21. Also, the processes of the following flowchart are executed when the document management service 40 is loaded onto the RAM 23 of the document management server 13 and is executed by the CPU 21. Note that broken arrows in FIGS. 9A and 9B indicate transmission/reception of a request/response between the document monitor application 33 and document management service 40.

In step S1001, the document monitor application 33 receives a document update request from the Web browser 31. The request includes a document ID used to uniquely specify a document, and change contents. In step S1002, the document monitor application 33 executes database ID specifying processing. This processing is the same as that in step S905 described using FIG. 8. Next, the document monitor application 33 executes request processing for the document management service 40 in steps S1003 to S1009. Since the processing logic of these processes is equivalent to that of the processes in steps S908 to S914 described using FIG. 8 except for only the request contents and response contents to the Web browser 31, a description thereof will not be given.

Next, processing executed when the document management service 40 receives the document data update request from the document monitor application 33 will be described below. In step S1010, the document management service 40 receives the document data update request from the document monitor application 33. This request includes a document ID used to uniquely specify a document, update contents, and a user ID. In step S1011, the document management service 40 executes database ID confirming processing. In this processing, the same processing as the database ID specifying processing in step S905 in FIG. 8 is executed to confirm whether or not data corresponding to the requested user ID is managed. In step S1012, the document management service 40 checks a confirmation result. If the confirmation result indicates a failure, since the database information 710 held by itself may be old, the document management service 40 acquires the latest connection management table 52 from the monitoring service 50 in step S1013. If the acquired connection management table 52 has been updated, the document management service 40 repeats the process in step S1011. If the acquired connection management table 52 has not been updated, since a request destination is wrong, the document management service 40 returns a request rejection to the document monitor application 33 in step S1015, thus ending the processing.

If the confirmation result indicates a success in step S1012, the document management service 40 confirms the service status of the own service in the status management module 414 in step S1016. As the service status in this case, whether the service operates in "normal mode" or "limited mode" is determined. In this case, "normal mode" indicates a mode in a normal status that allows respective services to be operable without any limitations, and "limited mode" indicates a mode in a limited status that does not receive any database update request. If the service status is "limited mode" in step S1016, since no update request can be received, the process transits to step S1015. On the other hand, if the service status is "normal mode", the document management service 40 accepts the document data update request in step S1017, and executes processing for updating document data. Then, the document management service 40 confirms the storage status of the own service in step S1018. This implements a storage status confirming unit. The storage status in this case includes "remote replica mode" in which replication is performed in a storage area in the replica service 60, and "local replica mode" in which replication is performed in a storage area managed by the own service. As a result of confirmation, if the storage status is "remote replica mode", the document management service 40 writes document data update contents in an intermediate data file based on the replica intermediate data storage path 714 in the connection management table 52 in step S1019. In step S1020, the document management service 40 checks a write result. If the write access has succeeded, the document management service 40 updates the document data in the database and returns a request success message to the document monitor application 33 in step S1021, thus ending the processing. If the intermediate data write access has failed, the document management service 40 transits the storage status of the own service to "local replica mode" in step S1022, records the intermediate data in a local area in step S1023, and then executes step S1021.

As a result of confirmation of the storage status in step S1018, if the storage status is "local replica mode", the document management service 40 attempts to access an intermediate data file based on the replica intermediate data storage path 714 in the connection management table 52 in step S1024. As a result, if the access has failed (not allowed to store in a remote replica service), the document management service 40 executes step S1023. If the access has succeeded (allowed to store in a remote replica service), the document management service 40 merges replica intermediate data stored in the local area so far to a remote intermediate data file in step S1025. Next, the document management service 40 transits the storage status of the own service to "remote replica mode" in step S1026, and then executes step S1020. The subsequent processes are as have been already described above. Note that a storage area setting unit is implemented by transiting the storage status to set the storage status as a replica mode. Also, a first storage success/failure determination unit is implemented by determining whether or not data can be stored in the storage area of the replica server in the remote replica mode (S1020). Furthermore, a second storage success/failure determination unit is implemented by determining whether or not data can be stored in the storage area of the replica server in the local replica mode (S1024). The storage area included in the replica server will also be called a first storage area, and that included in the document management server will also be called a second storage area, for the sake of convenience.

With the above processing, when the document monitor application 33 issues a document data update request to the document management service 40, document data update processing and replica intermediate data recording processing are executed depending on conditions. When a communication with the remote area as the backup destination of the database has failed, processing can be continued by replicating data in the local area. However, when fail-over processing takes place while data is replicated in the local area, the data may be lost. For this reason, the monitoring service 50 determines whether or not to execute fail-over processing by recognizing the status of the document management service 40. Details of this fail-over processing will be described later.

[Document Management Processing]

Figure 10:
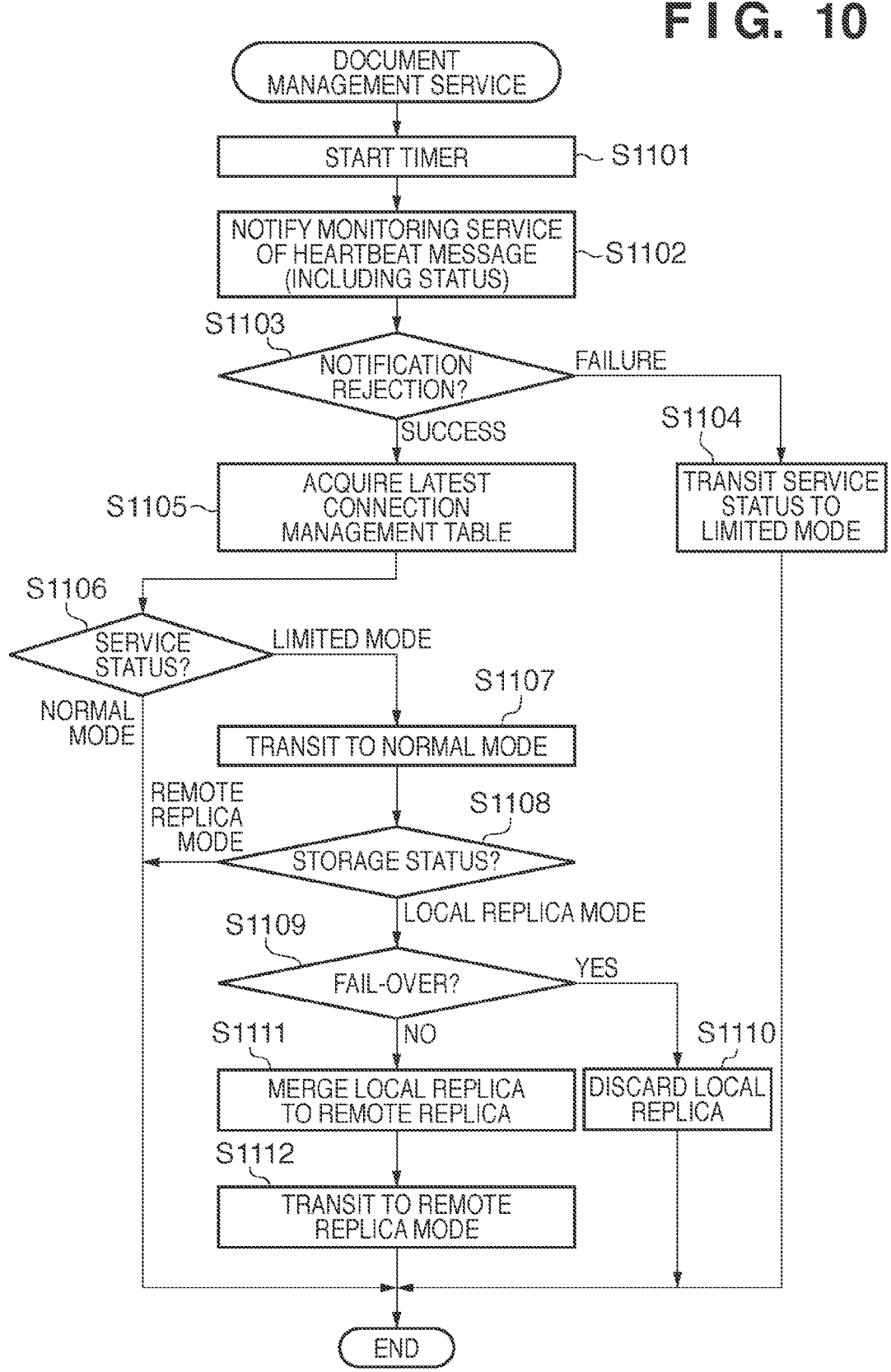
FIG. 10 is a flowchart of processing in a document management service according to the embodiment.

FIG. 10 is a flowchart for explaining notification of a heartbeat message from the document management service 40 to the monitoring service 50 and status transitions depending on a notification state. Note that the processes of the following flowchart are executed when the document management service 40 is loaded onto the RAM 23 of the document management server 13 and is executed by the CPU 21 as in FIGS. 9A and 9B.

The document management service 40 is set with a timer which starts periodically, and executes the following sequence to have, as a trigger, the start of the timer in step S1101. In step S1102, the document management service 40 attempts to notify the monitoring service 50 of a heartbeat message of the own service. In this case, the document management service 40 notifies the monitoring service 50 of the storage status of the own service. More specifically, the document management service 40 notifies the monitoring service 50 of "remote replica mode" or "local replica mode". In step S1103, the process branches depending on whether or not the notification of the heartbeat message has succeeded. If the notification of the heartbeat message has failed, the document management service 40 transits the service status of the own service managed in the status management module 414 to "limited mode" in step S1104, thus ending the processing. If the notification of the heartbeat message has succeeded, the document management service 40 acquires the latest connection management table 52 from the monitoring service 50 as a response to the heartbeat message in step S1105. Upon reception of the heartbeat message, the monitoring service 50 records a date and time of receiving the notification in the date and time of latest notification 802 in the status information 800. Next, the document management service 40 checks in step S1106 whether the service status of the own service is "normal mode" or "limited mode". If the service status is "normal mode", the processing ends.

If the service status is "limited mode", the document management service 40 transits the service status of the own service managed in the status management module 414 to "normal mode" in step S1107. Next, the document management service 40 checks in step S1108 whether the storage status of the own service is "remote replica mode" or "local replica mode". If the storage status is "remote replica mode", the processing ends. If the storage status is "local replica mode", the document management service 40 confirms in step S1109 the latest connection management table 52 acquired in step S1105 so as to confirm whether or not the database managed by the own service has undergone fail-over processing to another service. If the database has undergone the fail-over processing, since the own server is an abnormal system, the document management service 40 discards replica intermediate data stored in the local area in step S1110, thus ending the processing. If the database has not undergone the fail-over processing, the document management service 40 merges replica intermediate data stored in the local area to a remote intermediate data file in step S1111, and transits the storage status of the own service to "remote replica mode" in step S1112, thus ending the processing.

With the above processing, the document management service 40 notifies the monitoring service 50 of the heartbeat status, and transits the statuses of the own service depending on the notification state. If the notification of the heartbeat message has failed, the document management service 40 transits the own service to "limited mode" and does not receive any update request of the database managed by itself. Therefore, a situation in which both operating and stand-by nodes update data as operating nodes as a result of fail-over processing can be prevented.

[Replica Service Processing]

Figure 11:
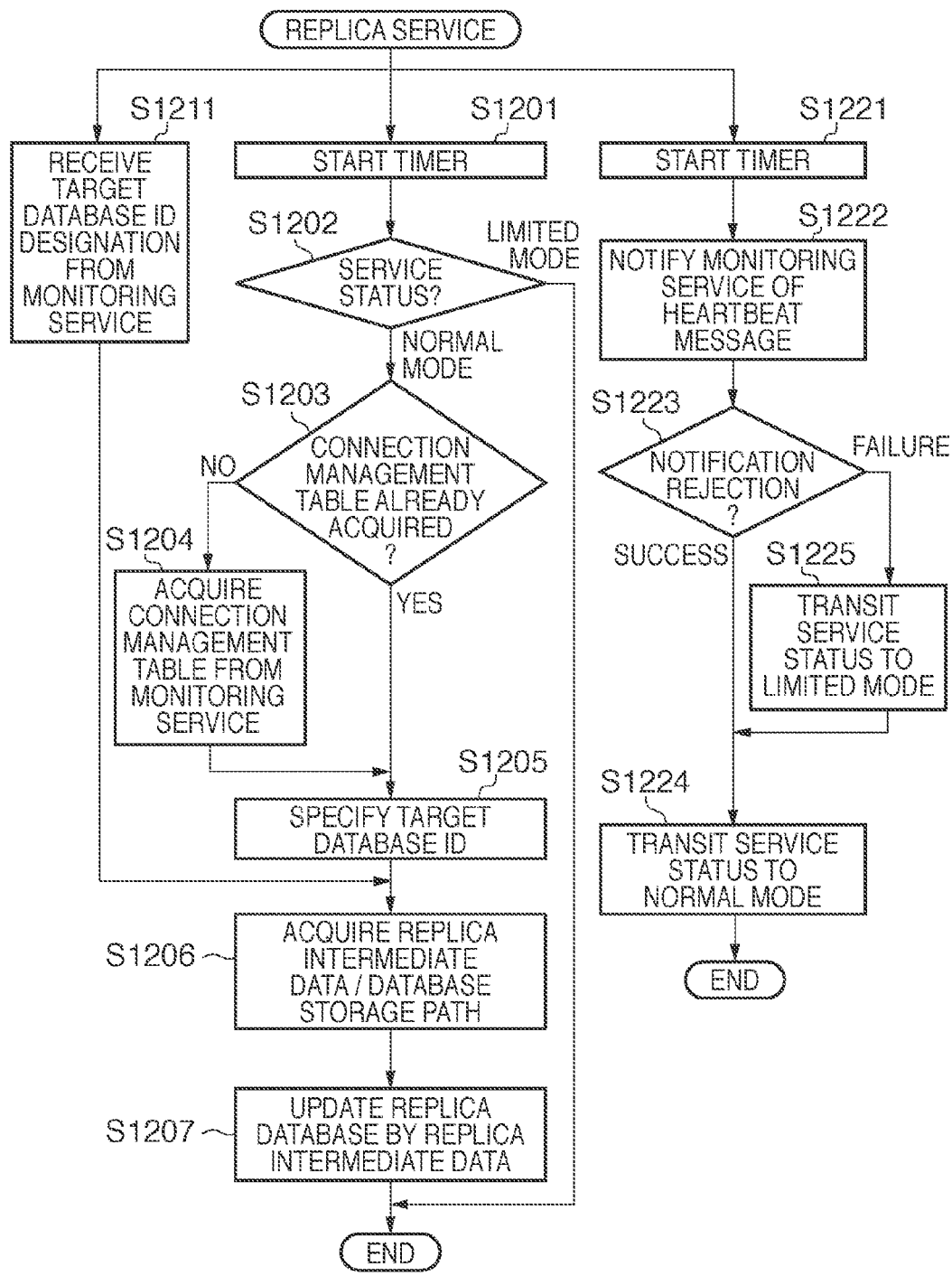
FIG. 11 is a flowchart of processing in a replica service according to the embodiment.

FIG. 11 is a flowchart showing replica generation processing and heartbeat message notification processing to the monitoring service 50 in the replica service 60. Note that the processes of the following flowchart are executed when the replica service 60 is loaded onto the RAM 23 of the replica server 15 and is executed by the CPU 21. The replica service 60 is set with a timer which starts periodically, and executes the following sequence to have, as a trigger, the start of the timer in step S1201. In step S1202, the replica service 60 confirms the status management module 614 to determine whether the service status of the own service is "normal mode" or "limited mode". If the service status is "limited mode", the processing ends. If the service status is "normal mode", the replica service 60 confirms in step S1203 whether or not the connection management table 52 has already been acquired. If the connection management table 52 has not been acquired yet, the replica service 60 acquires the connection management table 52 from the monitoring service 50 in step S1204. In step S1205, the replica service 60 specifies a database as a replica generation target. More specifically, the replica service 60 specifies a database ID whose replica service ID 713 in the database information 710 in the acquired connection management table 52 matches the service ID of the own service.

Next, the replica service 60 acquires the replica intermediate data storage path 714 and replica database storage path 715 of the specified database ID in step S1206. In step S1207, the replica service 60 updates the replica database by replica intermediate data. More specifically, the replica intermediate data stores a command to be executed by the document management service 40 for the database, and the replica service 60 executes this command for the replica database, thus attaining replication. As shown in step S1211, the replica service 60 can execute the process in step S1206 in response to a request from the monitoring service 50. In this case, the request includes a database ID. After the replica service 60 receives the request from the monitoring service 50 in step S1211, the process transits to step S1206, thus executing the subsequent processes.

Furthermore, the replica service 60 is set with a timer which starts periodically, and executes the subsequent sequence to have, as a trigger, the start of the timer in step S1221. This timer may be configured as that common to the timer used in step S1201 or as an independent timer. In step S1222, the replica service 60 attempts to notify the monitoring service 50 of a heartbeat message. In step S1223, the process branches depending on whether or not the notification of the heartbeat message has succeeded. If the notification of the heartbeat message has succeeded, the replica service 60 transits the status of the own service managed in the status management module 614 to "normal mode" in step S1224, thus ending the processing. In this case, upon reception of the heartbeat message, the monitoring service 50 records a date and time of receiving the notification in the date and time of latest notification 802 in the status information 800. If the notification of the heartbeat message has failed, the replica service 60 transits the service status of the own service managed in the status management module 614 to "limited mode" in step S1225, thus ending the processing.

With the above processing, the replica service 60 notifies the monitoring service 50 of a heartbeat message, and transits the status of the own service depending on the notification state. If the notification of the heartbeat message has failed, the replica service 60 transits the own service to "limited mode", and does not update the replica database managed by itself. Hence, both operating and stand-by nodes can be prevented from updating replica data as operating nodes as a result of fail-over processing.

[Monitoring Service Processing]

Figure 12:
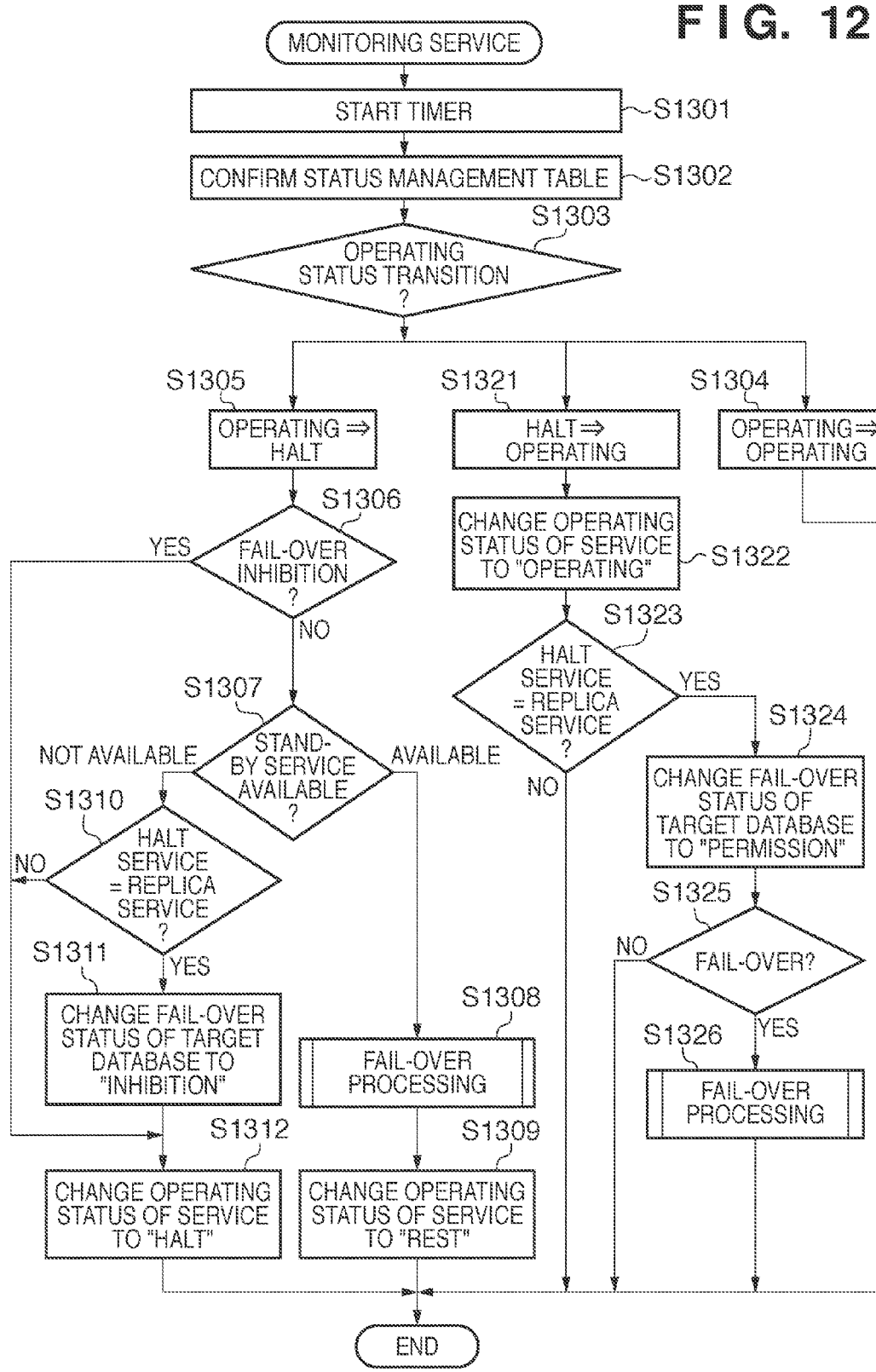
FIG. 12 is a flowchart of processing in a monitoring service according to the embodiment.

FIG. 12 is a flowchart of the status management of respective services in the monitoring service 50. The monitoring service 50 is set with a timer, which starts periodically, and executes the following sequence to have, as a trigger, the start of the timer in step S1301. Note that the processes of the following flowchart are executed when the monitoring service 50 is loaded onto the RAM 23 of the monitoring server 14 and is executed by the CPU 21. Not only edit of a document but also deleting and addition of the document are included in the update contents.

The monitoring service 50 confirms the status management table 53 in step S1302. The monitoring service 50 confirms a status transition of a service in step S1303, and executes the following processes. If the operating status transits from "operating" to "operating" (S1304) and, more particularly, if the status 803 in the status management table 53 is "operating" and the date and time stored in the date and time of latest notification 802 falls within a predetermined period, the processing ends.

If the operating status of the service transits from "operating" to "halt" (S1305) and, more particularly, if the status 803 in the status management table 53 is "operating", and the date and time stored in the date and time of latest notification 802 exceeds a predetermined period, the monitoring service 50 executes processes in steps S1306 to S1312. If the operating status transits from "halt" to "operating" (S1321) and, more particularly, if the status 803 in the status management table 53 is "halt", and the date and time stored in the date and time of latest notification 802 falls within a predetermined period, the monitoring service 50 executes processes in steps S1322 to S1326.

A case will be explained below wherein the operating status of the service in the status management table 53 transits from "operating" to "halt". The monitoring service 50 determines in step S1306 whether or not the service whose status transited to "halt" can undergo fail-over processing. More specifically, this determination step is attained by the following two processes. In one process, the monitoring service 50 confirms whether the fail-over statuses of all databases mapped in an ID are "fail-over inhibition" or "fail-over permission". This implements a fail-over determination unit. More specifically, the monitoring service 50 confirms the fail-over mode 716 of the database information 710. In the second process, the monitoring service 50 confirms the replica mode 804 in the status information 800 of the service whose status transited to "halt". If the replica mode 804 is "local replica mode", the monitoring service 50 determines "fail-over inhibition". If the service manages a database which has "fail-over inhibition" as the fail-over status, the monitoring service 50 transits the operating state of the service to "halt" in step S1312, thus ending the processing.

If all the databases managed by the service have "fail-over permission" as their fail-over statuses, the monitoring service 50 determines in step S1307 whether a service which has the same service type and whose operating status in the status management table 53 is "stand-by" is available. This implements a stand-by service confirmation unit. If a "stand-by" service is available, the monitoring service 50 executes fail-over processing (to be described later) in step S1308, and transits the operating status of that service to "halt" in step S1309, thus ending the processing. That is, the fail-over processing from the "halt" service to another "stand-by" service is executed. Note that a service whose operating status transited to "halt" will also be referred to as a first service (for example, a first replica service), and a service whose operating status was "stand-by" will also be referred to as a second service (for example, a second replica service), for the sake of convenience.

If no "stand-by" service is available, the monitoring service 50 determines in step S1310 whether or not the service type of that service is the replica service 60. If the service type is not the replica service, the monitoring service 50 transits the operating status of that service to "halt" in step S1312, thus ending the processing. On the other hand, if the service type of that service is the replica service 60, the monitoring service 50 sets the fail-over mode of databases (replica target databases) mapped in the replica service 60 to be "fail-over inhibition" in step S1311. Then, the monitoring service 50 transits the status 803 in the status management table 53 for the replica service 60 to "halt" in step S1312, thus ending the processing.

A case will be described below wherein the status 803 in the status management table 53 transits from "halt" to "operating". The monitoring service 50 transits the operating state of that service to "operating" in step S1322. The monitoring service 50 determines in step S1323 whether or not the service type of that service is the replica service 60. If the service type is not the replica service 60, the processing ends. If the service type of that service is the replica service 60, the monitoring service 50 sets the fail-over mode of databases mapped in the replica service to be "fail-over permission" in step S1324. The monitoring service 50 determines in step S1325 whether or not fail-over processing takes place due to a change to "fail-over permission". If the fail-over processing does not take place, the processing ends. If the fail-over processing takes place, the monitoring service 50 executes the fail-over processing in step S1326, thus ending the processing.

With the above processing, the monitoring service 50 determines whether or not the fail-over processing can be executed, thereby solving the problem of data loss due to the fail-over processing which takes place in a situation in which data is replicated to the local area.

[Fail-Over Processing]

FIG. 13 is a sequence chart of the fail-over processing executed by the monitoring service 50. Note that the processes in respective sequences are executed when the respective services are loaded onto the RAMs 23 of the respective servers and are executed by the CPUs 21. Note that the sequences shown in FIG. 13 show the process in step S1308 when the processes in steps S1301 to S1307 in the flowchart shown in FIG. 12 are executed by the monitoring service 50.

The monitoring service 50 confirms the status management table 53 in sequence S1401. This process is the same as that in step S1302 shown in FIG. 12. As a result, since a document management service 40A transits from "operating" to "stand-by", and a document management service 40B as a stand-by service exists, the fail-over processing in step S1308 in FIG. 12 is executed. In sequence S1402, the monitoring service 50 transits the operating status of the document management service 40A from "operating" to "processing in progress", and transits the operating status of the document management service 40B from "stand-by" to "processing in progress".

Subsequently, the monitoring service 50 requests the replica service 60 to update the replica database by designating the database ID managed by the document management service 40A in sequence S1403. In sequence S1404, the replica service 60 receives the ID designated by the monitoring service 50, and updates the replica database 62. This process corresponds to steps S1211, S1206, and S1207 in FIG. 11.

The monitoring service 50 copies the updated replica database 62 to the database managed by the document management service 40B in sequence S1405. The monitoring service 50 then transits the operating status of the document management service 40B from "processing in progress" to "stand-by for operation" in sequence S1406, and requests the document management service 40B to start the service in sequence S1407. Upon reception of a start instruction from the monitoring service 50, the document management service 40B executes activation processing, and notifies the monitoring service 50 of a heartbeat message after the service is ready to start. This heartbeat message notification corresponds to the process in step S1102 in FIG. 10.

Upon reception of the heartbeat message from the document management service 40B, the monitoring service 50 changes the operating status of the document management service 40B from "stand-by for operation" to "operating" in sequence S1409. Furthermore, the monitoring service 50 changes the service ID in the database information 710 of the connection management table 52 from that of the document management service 40A to that of the document management service 40B. After that change, the monitoring service 50 changes the operating status of the document management service 40A from "processing in progress" to "rest". This process corresponds to that in step S1309 in FIG. 12. Subsequently, the monitoring service 50 notifies the document management service 40B of the latest connection management table as a response to the heartbeat message.

With the above processing, the monitoring service 50 executes the fail-over processing. After that, the processes in sequences S1411 to S1417 in the document monitor application 33 are executed. These processes correspond to steps S905 to S914 in FIG. 8 and steps S1002 to S1009 in FIGS. 9A and 9B.

As described above, even in a cluster system configured by a plurality of operating nodes, the fail-over processing that can avoid a situation in which both operating and stand-by nodes update identical data can be implemented under the control of the single monitoring server alone. Also, data can be prevented from being lost as a result of execution of the fail-over processing when a communication link with a server which holds a backup is disconnected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296379, filed Dec. 25, 2009, which is hereby incorporated by reference herein in its entirety.

What is claimed is:

1. A data management apparatus, which is connected to a monitoring apparatus that monitors an operating state of a service and a replica apparatus that provides a service for replicating data, and which provides a service for managing data, comprising:
a status management unit which manages a status of a service provided by itself;
a notification unit which periodically notifies the monitoring apparatus of a status of the service;
a receiving unit which receives a request from an application to which the service is provided;
a rejecting unit which rejects, when the request received by the receiving unit is an update request of data, the update request if a status associated with updating of the service managed by the status management unit is a limited status,
an update unit which updates managed data;
a storage area setting unit which sets a storage area for storing update contents as a status associated with storage;
a first storage unit which stores the update contents in a first storage area included in the replica apparatus based on a setting by the storage area setting unit upon updating by the update unit;
a second storage unit which stores the update contents in a second storage area included in the data management apparatus based on the setting by the storage area setting unit upon updating by the update unit; and
a first storage success/failure determination unit which determines whether or not the first storage unit has succeeded at storage in the first storage area, and
wherein when the notification by the notification unit has failed, the status management unit transits the status associated with updating of the service to a limited status, and
when the notification by the notification unit has succeeded, the status management unit transits the state associated with updating of the service to a normal status in which the update request is not rejected,
wherein when the first storage success/failure determination unit determines that the first storage unit has failed storage in the first storage area, the storage area setting unit transits the status associated with storage of the service to a storage status for storing the update contents in the second storage area, and
wherein at least one processor functions as at least one of the units.

2. The apparatus according to claim 1, further comprising:
a storage status confirming unit which confirms a storage area which is set to store the update contents of a storage status of the service upon updating by the updating unit; and
a second storage success/failure determination unit which determines whether or not the update contents are allowed to be stored in the first storage area when the storage status is set to store the update contents in the second storage area,
wherein when the second storage success/failure determination unit determines that the update contents are not allowed to be stored in the first storage area, the second storage unit stores the update contents in the second storage area, and
when the second storage success/failure determination unit determines that the update contents are allowed to be stored in the first storage area, the first storage unit stores the update contents stored in the second storage area in the first storage area.

3. The apparatus according to claim 2, wherein the notification unit notifies the monitoring apparatus of information indicating that the status associated with storage of the service is set to have a storage status for storing the update contents in the first storage area or the second storage area together upon notifying the monitoring apparatus of the status of the service.

4. A monitoring apparatus, which monitors an operating state of a service provided by a connected data management apparatus, comprising:
a management unit which manages a status associated with operation of the service to be monitored based on a notification from a connected apparatus;
a determination unit which determines whether or not the status associated with operation of the service, which is held in the management unit, transits from an operating status to a halt status;
a fail-over determination unit which determines, for the service, the status associated with operation of which is determined to have transited from the operating status to the halt status, whether or not a status associated with fail-over processing indicates inhibition; and a halt unit which halts the service, the status associated with operation of which is determined to have transited to the halt status, when the fail-over determination unit determines that the fail-over processing is inhibited, wherein the data management apparatus comprises:

a status management unit which manages a status of a service provided by itself;

a notification unit which periodically notifies the monitoring apparatus of a status of the service;

a receiving unit which receives a request from an application to which the service is provided;

a rejecting unit which rejects, when the request received by the receiving unit is an update request of data, the update request if a status associated with updating of the service managed by the status management unit is a limited status, an update unit which updates managed data;

a storage area setting unit which sets a storage area for storing update contents as a status associated with storage;

a first storage unit which stores the update contents in a first storage area included in a replica apparatus based on a setting by the storage area setting unit upon updating by the update unit;

a second storage unit which stores the update contents in a second storage area included in the data management apparatus based on the setting by the storage area setting unit upon updating by the update unit; and a first storage success/failure determination unit which determines whether or not the first storage unit has succeeded at storage in the first storage area, and wherein when the notification by the notification unit has failed, the status management unit transits the status associated with updating of the service to a limited status, and when the notification by the notification unit has succeeded, the status management unit transits the state associated with updating of the service to a normal status in which the update request is not rejected, wherein when the first storage success/failure determination unit determines that the first storage unit has failed storage in the first storage area, the storage area setting unit transits the status associated with storage of the service to a storage status for storing the update contents in the second storage area and wherein at least one processor functions as at least one of the units.

5. The apparatus according to claim 4, wherein the fail-over determination unit inhibits the fail-over processing for the service when the status associated with storage is a storage status in a second storage area.

6. The apparatus according to claim 4, wherein the fail-over determination unit inhibits the fail-over processing when data managed by the service has a fail-over inhibition status.

7. A cluster system, which comprises a plurality of data management apparatuses, a plurality of replica apparatuses, and a monitoring apparatus, wherein a data management apparatus comprises:

a status management unit which manages a status of a service provided by itself;

a notification unit which periodically notifies the monitoring apparatus of a status of the service;

a receiving unit which receives a request from an application to which the service is provided; and a rejecting unit which rejects, when the request received by the receiving unit is an update request of data, the update request if the status associated with updating of the service managed by the status management unit is a limited status, when the notification by the notification unit has failed, the status management unit transits the status associated with updating of the service to a limited status, when the notification by the notification unit has succeeded, the status management unit transits the state associated with updating of the service to a normal status in which the update request is not rejected, a replica apparatus comprises:

a status management unit which manages a status of a service provided by itself;

a notification unit which periodically notifies the monitoring apparatus of a status associated with operation; and a reflection unit which reflects, when the status associated with updating of the service is a normal status, update contents stored in a second storage area included in the data management apparatus to data stored in a first storage area included in the replica apparatus, and the monitoring apparatus comprises:

a management unit which manages a status associated with operation of the service to be monitored based on a notification from a connected apparatus;

a determination unit which determines whether or not the status associated with operation of the service, which is managed by the management unit, transits from an operating status to a halt status;

a fail-over determination unit which determines, for the service, the status associated with operation of which is determined to have transited from the operating status to the halt status, whether or not a status associated with fail-over processing indicates inhibition; and a halt unit which halts the service, the status associated with operation of which is determined to have transited to the halt status when the fail-over determination unit determines that the fail-over processing is inhibited.

8. A control method of a data management apparatus, which is connected to a monitoring apparatus that monitors an operating state of a service and a replica apparatus that provides a service for replicating data, and which provides a service for managing data, comprising:

a status management step of managing a status of a service provided by itself;

a notification step of periodically notifying the monitoring apparatus of a status of the service;

a receiving step of receiving a request from an application to which the service is provided;

a rejecting step of rejecting, when the request received in the receiving step is an update request of data, the update request if the status associated with updating of the service managed in the status management step is a limited status, an updating step of updating managed data;

a storage area setting step of setting a storage area for storing update contents as a status associated with storage;

a first storage step of storing the update contents in a first storage area included in the replica apparatus based on a setting in the storage area setting step upon updating in the updating step;

a second storage step of storing the update contents in a second storage area included in the data management apparatus based on the setting in the storage area setting step upon updating in the updating step; and a first storage success/failure determination step of determining whether or not the first storage step has succeeded at storage in the first storage area, and wherein in the status management step, when the notification in the notification step has failed, the status associated with updating of the service is transited to a limited status, and when the notification in the notification step has succeeded, the state associated with updating of the service is transited to a normal status in which the update request is not rejected, wherein when it is determined in the first storage success/failure determination step that storage in the first storage area has failed, the status associated with storage of the service is transited to a storage status for storing the update contents in the second storage area.

9. A control method of a monitoring apparatus, which monitors an operating state of a service provided by a connected data management apparatus, comprising:

a management step of managing a status associated with operation of the service to be monitored based on a notification from the apparatus;

a determination step of determining whether or not the status associated with operation of the service, which is managed in the management step, transits from an operating status to a halt status;

a fail-over determination step of determining, for the service, the status associated with operation of which is determined to have transited from the operating status to the halt status, whether or not a status associated with fail-over processing indicates inhibition; and a halt step of halting the service, the status associated with operation of which is determined to have transited to the halt status when it is determined in the fail-over determination step that the fail-over processing is inhibited, wherein a control method of the data management apparatus comprises:

a status management step of managing a status of a service provided by itself;

a notification step of periodically notifying the monitoring apparatus of a status of the service;

a receiving step of receiving a request from an application to which the service is provided;

a rejecting step of rejecting, when the request received in the receiving step is an update request of data, the update request if the status associated with updating of the service managed in the status management step is a limited status, an updating step of updating managed data;

a storage area setting step of setting a storage area for storing update contents as a status associated with storage;

a first storage step of storing the update contents in a first storage area included in the replica apparatus based on a setting in the storage area setting step upon updating in the updating step;

a second storage step of storing the update contents in a second storage area included in the data management apparatus based on the setting in the storage area setting step upon updating in the updating step; and a first storage success/failure determination step of determining whether or not the first storage step has succeeded at storage in the first storage area, and wherein in the status management step, when the notification in the notification step has failed, the status associated with updating of the service is transited to a limited status, and when the notification in the notification step has succeeded, the state associated with updating of the service is transited to a normal status in which the update request is not rejected, and wherein when, in the first storage success/failure determination step, it is determines that storage in the first storage area has been failed, the status associated with storage of the service is transited to a storage status for storing the update contents in the second storage area.

10. A non-transitory computer-readable medium storing a program controlling a computer to function as:

a status management unit which manages a status of a service provided by itself;

a notification unit which periodically notifies a monitoring apparatus of a status of the service;

a receiving unit which receives a request from an application to which the service is provided;

a rejecting unit which rejects, when the request received by the receiving unit is an update request of data, the update request if a status associated with updating of the service managed by the status management unit is a limited status;

an update unit which updates managed data;

a storage area setting unit which sets a storage area for storing update contents as a status associated with storage;

a first storage unit which stores the update contents in a first storage area included in a replica apparatus based on a setting by the storage area setting unit upon updating by the update unit;

a second storage unit which stores the update contents in a second storage area included in the data management apparatus based on the setting by the storage area setting unit upon updating by the update unit; and a first storage success/failure determination unit which determines whether or not the first storage unit has succeeded at storage in the first storage area, and wherein when the notification by the notification unit has failed, the status management unit transits the status associated with updating of the service to a limited status, and when the notification by the notification unit has succeeded, the status management unit transits the state associated with updating of the service to a normal status in which the update request is not rejected, and wherein when the first storage success/failure determination unit determines that the first storage unit has failed storage in the first storage area, the storage area setting unit transits the status associated with storage of the service to a storage status for storing the update contents in the second storage area.

11. A non-transitory computer-readable medium storing a program controlling a computer to function as:

a management unit which manages a status associated with operation of the service provided by a connected data management apparatus to be monitored based on a notification from a connected apparatus;

a determination unit which determines whether or not the status associated with operation of the service, which is managed by the management unit, transits from an operating status to a halt status;

a fail-over determination unit which determines, for the service, the status associated with operation of which is determined to have transited from the operating status to the halt status, whether or not a status associated with fail-over processing indicates inhibition; and a halt unit which halts the service, the status associated with operation of which is determined to have transited to the halt status when the fail-over determination unit determines that the fail-over processing is inhibited, wherein the data management apparatus comprises:

a status management unit which manages a status of a service provided by itself;

a notification unit which periodically notifies the monitoring apparatus of a status of the service;

a receiving unit which receives a request from an application to which the service is provided;

a rejecting unit which rejects, when the request received by the receiving unit is an update request of data, the update request if a status associated with updating of the service managed by the status management unit is a limited status, an update unit which updates managed data;

a storage area setting unit which sets a storage area for storing update contents as a status associated with storage;

a first storage unit which stores the update contents in a first storage area included in a replica apparatus based on a setting by the storage area setting unit upon updating by the update unit;

a second storage unit which stores the update contents in a second storage area included in the data management apparatus based on the setting by the storage area setting unit upon updating by the update unit; and a first storage success/failure determination unit which determines whether or not the first storage unit has succeeded at storage in the first storage area, and wherein when the notification by the notification unit has failed, the status management unit transits the status associated with updating of the service to a limited status, and when the notification by the notification unit has succeeded, the status management unit transits the state associated with updating of the service to a normal status in which the update request is not rejected, and wherein when the first storage success/failure determination unit determines that the first storage unit has failed storage in the first storage area, the storage area setting unit transits the status associated with storage of the service to a storage status for storing the update contents in the second storage area.

* * * * *